US010762395B2

(12) United States Patent
Onozawa

(10) Patent No.: US 10,762,395 B2
(45) Date of Patent: Sep. 1, 2020

(54) IMAGE PROCESSING APPARATUS, IMAGE PROCESSING METHOD, AND RECORDING MEDIUM

(71) Applicant: CASIO COMPUTER CO., LTD., Shibuya-ku, Tokyo (JP)

(72) Inventor: Masaru Onozawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 172 days.

(21) Appl. No.: 15/948,101

(22) Filed: Apr. 9, 2018

(65) Prior Publication Data
US 2018/0314919 A1    Nov. 1, 2018

(30) Foreign Application Priority Data

Apr. 26, 2017  (JP) ................. 2017-087638

(51) Int. Cl.
*G06K 9/00* (2006.01)
*G06K 9/62* (2006.01)
*G06K 9/68* (2006.01)
*G06T 3/40* (2006.01)
*G06T 11/60* (2006.01)

(52) U.S. Cl.
CPC ....... *G06K 9/6268* (2013.01); *G06K 9/00664* (2013.01); *G06K 9/6218* (2013.01); *G06K 9/6256* (2013.01); *G06K 9/6282* (2013.01); *G06K 9/68* (2013.01); *G06T 3/4038* (2013.01); *G06T 11/60* (2013.01)

(58) Field of Classification Search
None
See application file for complete search history.

(56) References Cited

U.S. PATENT DOCUMENTS

| 8,655,151 | B2 | 2/2014 | Yasuda | |
| 2013/0287301 | A1* | 10/2013 | Nakate | G11B 27/034 382/190 |
| 2014/0016914 | A1 | 1/2014 | Yasuda et al. | |
| 2016/0120491 | A1* | 5/2016 | Shimamura | A61B 6/463 348/333.05 |

(Continued)

FOREIGN PATENT DOCUMENTS

| CN | 101331522 A | 12/2008 |
| CN | 103544198 A | 1/2014 |

(Continued)

OTHER PUBLICATIONS

Japanese Office Action dated Jul. 16, 2019 (and English translation thereof) issued in counterpart Japanese Application No. 2017-087638.

(Continued)

*Primary Examiner* — Wei Wen Yang
(74) *Attorney, Agent, or Firm* — Holtz, Holtz & Volek PC

(57) ABSTRACT

An image processing apparatus includes a processor and a memory. The processor executes a program stored in the memory to perform operations including: obtaining a plurality of image groups each containing a plurality of images classified based on contents of images; selecting an image from each of the plurality of image groups based on an evaluation result obtained by evaluating the plurality of images; and generating one image from the plurality of selected images.

14 Claims, 8 Drawing Sheets

(56) References Cited

U.S. PATENT DOCUMENTS

2017/0194034 A1* 7/2017 Onozawa .......... G06K 9/00758

FOREIGN PATENT DOCUMENTS

| JP | 2000125253 A | 4/2000 |
|----|--------------|--------|
| JP | 2005107867 A | 4/2005 |
| JP | 2011103135 A | 5/2011 |
| JP | 2012094949 A | 5/2012 |
| JP | 2014017779 A | 1/2014 |
| JP | 2016066343 A | 4/2016 |

OTHER PUBLICATIONS

Chinese Office Action (and English language translation thereof) dated Apr. 16, 2020 issued in Chinese Application No. 201810383322.7.

* cited by examiner

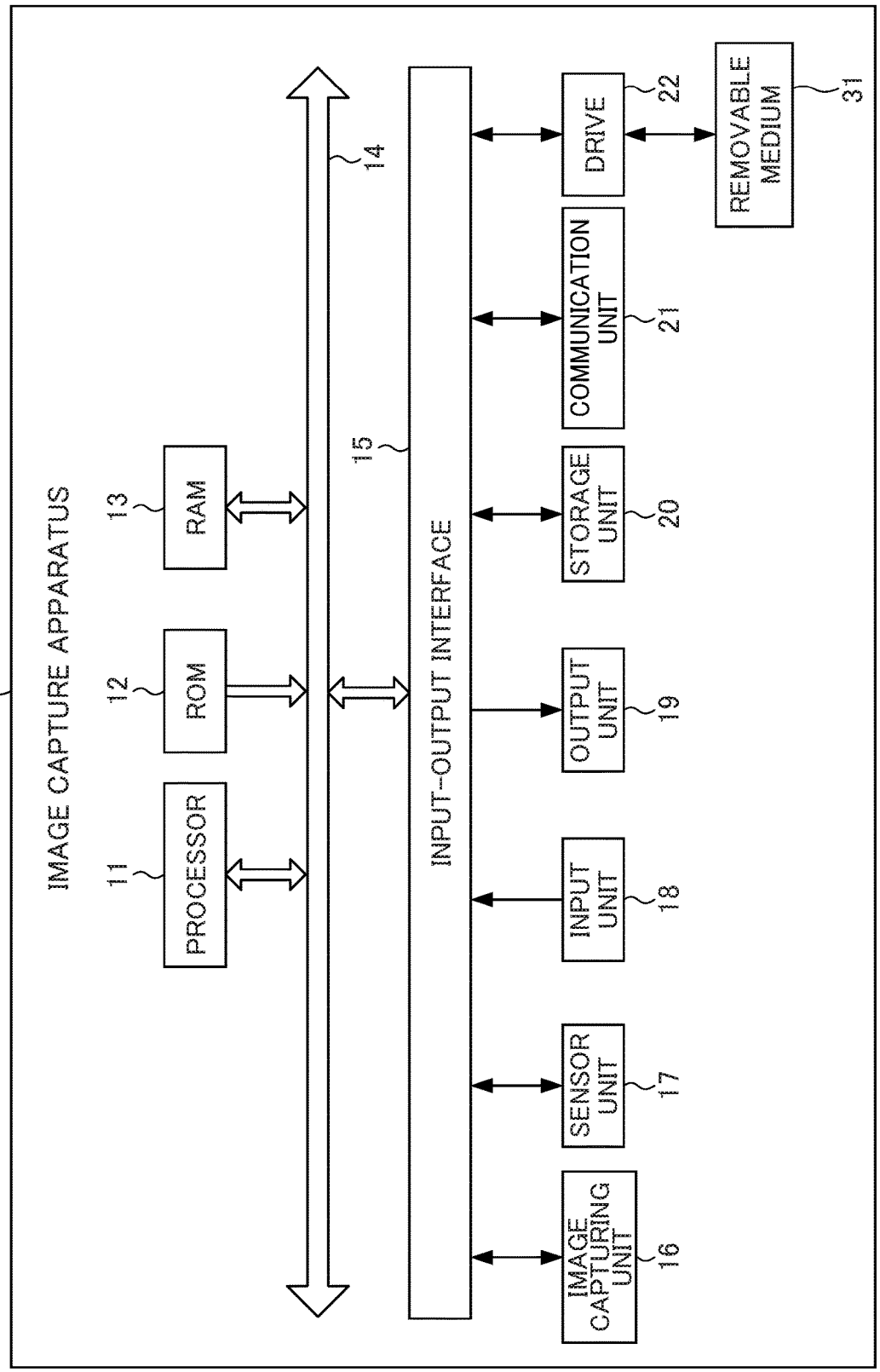

| Image [p] | A | B | C | D | E |
|---|---|---|---|---|---|
| Time [τ] | 2 | 3 | 2 | 3 | 2 |
| Score [s] | 8 | 5 | 7 | 6 | 7 |

| Image [p] | A | B | C | D | E |
|---|---|---|---|---|---|
| Category [c] | α | β | γ | α | β |
| Time [τ] | 2 | 3 | 2 | 3 | 2 |
| Score [s] | 8 | 5 | 7 | 6 | 7 |

|   | α | β | γ |
|---|---|---|---|
| α | 2 | 1 | 1/2 |
| β | 1 | 2 | 1/2 |
| γ | 1/2 | 1/2 | 2 |

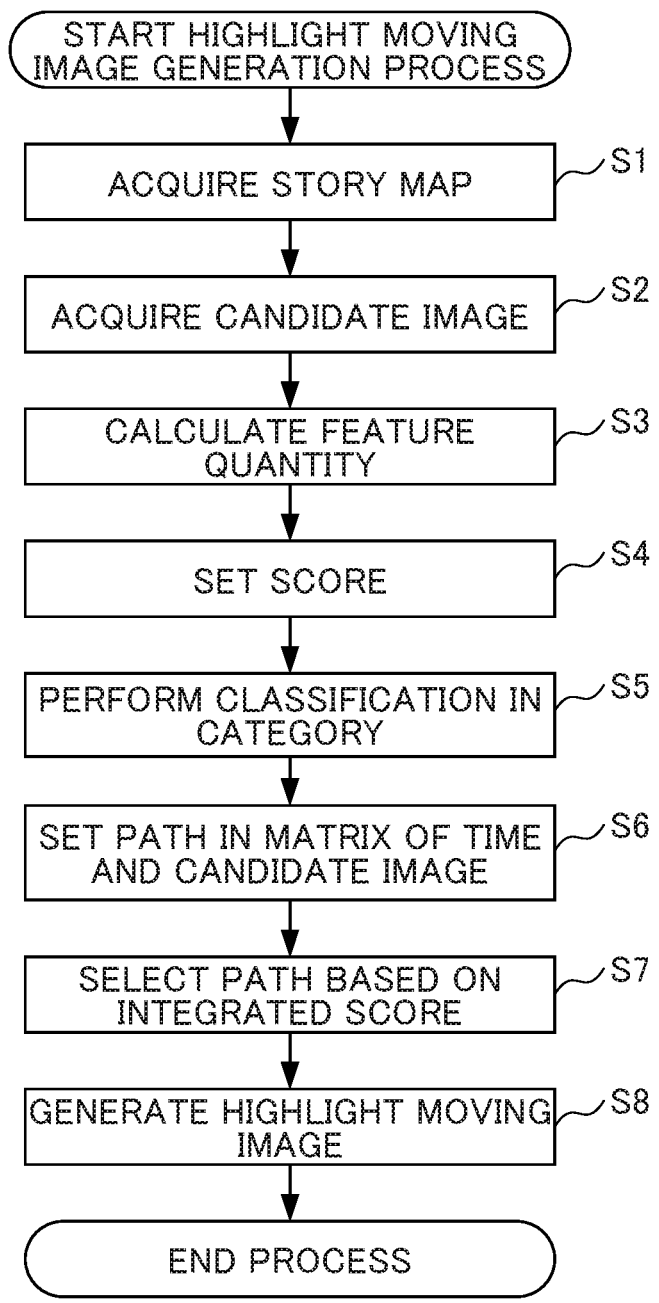

IMAGE PROCESSING APPARATUS, IMAGE PROCESSING METHOD, AND RECORDING MEDIUM

CROSS-REFERENCE TO RELATED APPLICATIONS

This application is based on and claims the benefit of priority from Japanese Patent Application No. 2017-087638, filed on Apr. 26, 2017, the content of which is incorporated herein by reference.

Field of the Invention

The present invention relates to an image processing apparatus, an image processing method, and a recording medium.

Related Art

Japanese Patent Application Publication No. JP 2016-066343 A discloses a technique for selecting a number of images from a plurality of images to generate a collage image or a moving image.

In the technique disclosed in JP 2016-066343 A, it is possible to generate an aggregated image obtained by aggregating images with high user evaluation by preferentially selecting images with high evaluation from a plurality of images and generating a collage image or a moving image. However, in the technique disclosed in JP 2016-066343 A, there was a problem that simple aggregated images might be obtained due to the similar composition of images with high evaluation.

The invention has been made in view of the related problems and an object of the invention is to provide aggregated images which are very attractive to a user.

SUMMARY OF THE INVENTION

An electronic apparatus according to an aspect of the present invention includes a processor and a memory. The processor executes a program stored in the memory to perform operations comprising: acquiring a series of position information of a user; detecting whether or not a loss part, in which position information corresponding to a predetermined time or a predetermined number of times of measurement is lost, is present in the series of position information acquired; and specifying the detected loss part in a case where the loss part is detected.

An image processing method executed by an image processing apparatus according to an aspect of the present invention includes a processor. The image processing method causing the processor to execute a program stored in a memory to perform operations including: obtaining a plurality of image groups each containing a plurality of images classified based on contents of images; selecting an image from each of the plurality of image groups based on an evaluation result obtained by evaluating the plurality of images; and generating one image from the plurality of selected images.

A non-transitory computer-readable storage medium storing a program that is executable by a computer according to an aspect of the present invention includes a processor. The program is executable to cause the computer to perform operations including: obtaining a plurality of image groups each containing a plurality of images classified based on contents of images; selecting an image from each of the plurality of image groups based on an evaluation result obtained by evaluating the plurality of images; and generating one image from the plurality of selected images.

BRIEF DESCRIPTION OF THE DRAWINGS

More detailed understanding of the present application can be obtained by considering the following detailed description together with the following drawings.

FIG. 1 is a block diagram illustrating a hardware configuration of an image capture apparatus according to an embodiment of the invention.

FIG. 2A is a diagram illustrating an individual reproduction time and an image score of each image and FIG. 2B is a diagram illustrating an image score integration path for selecting an image.

FIG. 3 is a schematic diagram illustrating a category of classified images.

FIG. 5A is a diagram illustrating a category, an individual reproduction time, and an image score of each image. FIG. 5B is a diagram illustrating a bonus multiplier set between categories. FIG. 5C is a diagram illustrating an image score integration path for selecting an image.

FIG. 8 is a flowchart illustrating a flow of a highlight moving image generation process executed by the image capture apparatus of FIG. 1 having the functional configuration of FIG. 6.

DETAILED DESCRIPTION OF THE INVENTION

Figures 2A, 2B:
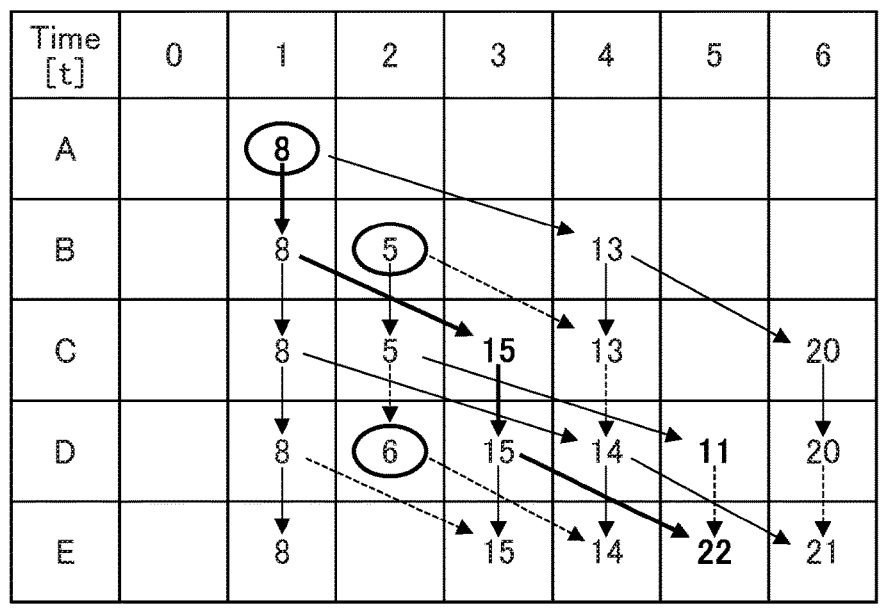
FIGS. 2A and 2B are schematic diagrams illustrating detailed optimization examples by score, where

Embodiments of the present invention will be explained with reference to the drawings. FIG. 1 is a block diagram showing the configuration of the hardware of the image capture apparatus 1. For example, the image capture apparatus 1 is a digital camera.

As shown in FIG. 1, the image capture apparatus 1 includes a processor (CPU) 11, a read only memory (ROM) 12, a random access memory (RAM) 13, a bus 14, an input-output interface 15, an image capture unit 16, a sensor unit 17, an input unit 18, an output unit 19, a storage unit 20, a communication unit 21, and a drive 22.

The processor 11 executes various types of processing according to a program stored in the ROM 12 or a program loaded from the storage unit 20 into the RAM 13.

Data and the like required by the processor 11 executing the various processing is stored in the RAM 13 as appropriate.

The processor 11, the ROM 12, and the RAM 13 are connected to each other via the bus 14. In addition, the input-output interface 15 is also connected to this bus 14. The input-output interface 15 is further connected to the image capture unit 16, the sensor unit 17, the input unit 18, the output unit 19, the storage unit 20, the communication unit 21, and the drive 22.

The image capture unit 16 includes an optical lens unit and an image sensor, which are not shown.

In order to photograph a subject, the optical lens unit is configured by a lens such as a focus lens and a zoom lens for condensing light. The focus lens is a lens for forming an image of a subject on the light receiving surface of the image sensor. The zoom lens is a lens that causes the focal length to freely change in a certain range. The optical lens unit also includes peripheral circuits to adjust setting parameters such as focus, exposure, white balance, and the like, as necessary.

The image sensor is configured by an optoelectronic conversion device, an AFE (Analog Front End), and the like. The optoelectronic conversion device is constituted by an optical sensor such as an optoelectronic conversion device of a CMOS (Complementary Metal Oxide Semiconductor) type. A subject image is incident upon the optoelectronic conversion device through the optical lens unit. The optoelectronic conversion device optoelectronically converts (i.e. captures) the image of the subject, accumulates the resultant image signal for a predetermined period of time, and sequentially supplies the image signal as an analog signal to the AFE. The AFE executes a variety of signal processing such as A/D (Analog/Digital) conversion processing of the analog signal. The variety of signal processing generates a digital signal that is output as an output signal from the image capture unit 16. The output signal of the image capture unit 16 will be hereinafter referred to as "captured image". The data of the captured image are provided to the processor 11 and an image processing unit and the like, not shown.

The sensor unit 17 is formed with various types of sensors such as an acceleration sensor and a gyro sensor. In the present embodiment, when the image capture unit 16 performs imaging, sensor information about imaging is obtained and stored in association with the captured image.

The input unit 18 is constituted by various buttons, and the like, and inputs a variety of information in accordance with instruction operations by the user.

The output unit 19 is constituted by a display, a speaker, and the like, and outputs images and sound.

The storage unit 20 is constituted by DRAM (Dynamic Random Access Memory) or the like, and stores various kinds of data.

The communication unit 21 controls communication with a different apparatus via the network 300 including the Internet.

A removable medium 31 composed of a magnetic disk, an optical disk, a magneto-optical disk, a semiconductor memory or the like is loaded in the drive 22, as necessary. Programs that are read via the drive 22 from the removable medium 31 are installed in the storage unit 20, as necessary. Like the storage unit 20, the removable medium 31 can also store a variety of data such as data of images stored in the storage unit 20.

The image capture apparatus with such a configuration has a function of selectively providing only featured images to be viewed by a user since it takes a huge amount of time when viewing all of stored images (here, referred to as moving images). The image capture apparatus 1 of this embodiment generates aggregated images (hereinafter, referred to as "highlight moving image") only having characteristic scenes by combining selected images and providing the aggregated images to be viewed by the user. At this time, the image capture apparatus 1 classifies the stored images into a plurality of categories, selects images using data in which a time-series category configuration (hereinafter, referred to as a "story map") is set in the highlight moving image, and generates the highlight moving image.

[Basic Flow of Image Combination Selection Method (Optimization by Score)]

In this embodiment, the image capture apparatus 1 calculates a feature amount of an image (hereinafter, referred to as a "candidate image") which is a candidate of a highlight moving image generation target based on attribute information such as sensor information (acceleration information or angular velocity information) at the time of capturing an image, an image analysis result (presence or absence of a specific subject such as a face), and usage information (information on the number of reproducing and uploading to SNS etc.). Then, based on the calculated feature amount, a score (hereinafter, appropriately referred to as an "image score") which is a value of an image is set. Additionally, the image score may be uniquely set according to an item used for calculating the feature amount based on the subjectivity of the person or may be set comprehensively in response to the weighted values after weighting feature amount items based on machine learning using a subjective evaluation result as teaching data.

Further, the image capture apparatus 1 searches for a largest score combination path of a score (hereinafter, referred to as an "integrated score") obtained by integrating the image scores of the images according to an image capturing procedure from the combination of the images in which the sum of the individual reproduction time (the total reproduction time) is within the largest reproduction time while the largest reproduction time of the highlight moving image is set as an upper limit. Here, in this embodiment, a method of selecting a path of a largest integrated score under the limitation of the largest reproduction time of the moving image is referred to as "optimization by score".

FIGS. 2A and 2B are schematic diagrams illustrating detailed optimization examples by score, where FIG. 2A is a diagram illustrating the individual reproduction time (Time) and the image score (Score) of each image (Image) and FIG. 2B is a diagram illustrating the image score integration path for selecting an image. In this example, the largest reproduction time of the highlight moving image is set to 6 sec. Additionally, in FIG. 2B, as a path from an origin node, a path that does not become an appropriate path from the viewpoint of a combination of the individual reproduction time, the image score, or the like is referred to as a "discarded path", a path which can be set is referred to as a "parent path", and a path of which an integrated score is the highest is referred to as an "optimal path".

Specifically, in this embodiment, a path in which the images are combined according to the image capturing procedure is set in a matrix of the individual reproduction time and the image of the image capturing procedure. In the combination of the paths, a combination of the path in which the integrated score obtained by integrating the image scores of the images in the path becomes the largest is selected as an image group constituting the highlight moving image. In this embodiment, the "path in which the images are combined according to the image capturing procedure" is a path calculated by sequentially searching for the path from the first image to the last images according to the image capturing procedure of the images.

In the example of FIG. 2B, images A to E are taken as candidate images of frame images constituting the highlight image in the image capturing procedure. In the images A to F, image scores calculated based on the feature amount of the image are set such that the image A [Score: 8], the image B [Score: 5], the image C [Score: 7], the image D [Score: 6], and the image F [Score: 7]. Further, the individual reproduction time of the image is set such that the image A [Time: 2 sec], the image B [Time: 3 sec], the image C [Time: 2 sec], the image D [Time: 3 sec], and the image E [Time: 2 sec]. Additionally, the individual reproduction time may be set to correspond to the image score or the like. Specifically, for example, the image having a high image score may be set to have a long individual reproduction time and the image having a low image score may be set to have a short individual reproduction time.

In the image group in which the image score and the individual reproduction time are set in this way, a path in which images are combined according to the image capturing procedure is set within the largest reproduction time of the set moving image in a matrix in which a vertical axis indicates the image capturing procedure of the image and a horizontal axis indicates the moving image reproduction time as illustrated in FIG. 2B. In the set path, the integrated score of all images constituting the path is calculated and a combination of the path having the largest integrated score is selected. In this example, a path having an integrated score [22] in the paths becomes a path in which the integrated score is the largest. The path includes a combination of the images C and E using the image A as an origin node. That is, the path of image A→image C→image E becomes an optimal path. Additionally, in this example, optimization by score is performed only by considering the integrated score, but optimization by score may be performed by considering a method of increasing the total reproduction time. In that case, a path having a combination of the images D and E using an origin node corresponding to the image A in which the total reproduction time is the largest to be 6 sec and the integrated score is relatively high to be [21] is selected.

Next, the image capture apparatus 1 can generate the highlight moving image for the total reproduction time obtained by summing the individual reproduction times of the images according to a reproduction procedure in the selected path.

[Selection Method (Story Fitting) Based on Story Map]

When the above-described optimization by score is performed, there is a case in which similar images may be included in the selected combination since the feature amount and the image score have a relation. Further, it is not appropriate to list only things with high image values (image scores) (featured ones) as the images from the viewpoint of the workability of the highlight moving image. Sometimes, it is desirable to make sharp moving images by inserting, for example, an image (a seasoning image) causing a fresh feeling in some places.

Here, in this method, an array (a story map) of time-series categories in the highlight moving image is prepared and images to be fitted to the position and the category on the time axis of the story map are selected and combined with reference to the story map among the images classified by the categories. Accordingly, it is possible to generate moving images based on a story configuration intended by the story map.

In a case in which images are selected according to this method, the images are first classified by the categories. FIG. 3 is a schematic diagram illustrating a category of classification of images. As illustrated in FIG. 3, the images can be classified into a plurality of categories in response to the image contents or parameters (including information of various sensors) acquired at the time of capturing images. For example, an image obtained by capturing a plurality of persons taking determined pose can be an image (hereinafter referred to as a "main image") of a category with a high degree of attention which is the center when editing the highlight moving image. As the main image, an image obtained by capturing a group of persons or an image obtained by capturing smiling faces of parsons can be selected. Further, an image which is intentionally captured by a photographer although the image does not include components of the main image and does not attract a high attention compared to the main image can be set to an image (hereinafter, referred to as a "sub-image") of a category almost similar to that of the main image at the time of editing the highlight moving image. As the sub-image, for example, an image having a smaller number of captured persons than that of the main image or an image captured with a specific composition (a foot image or the like) can be selected. Further, an image obtained by capturing a temporal or spatial index can be set to an image (hereinafter, referred to as a "key image") of a category showing a temporal or spatial flow in the captured image group. As the key image, for example, an image obtained by capturing a subject such as a spatial or temporal mark like a signpost or a clock can be selected. Further, an image obtained by capturing a general scenery can be set to an image of a category showing a realistic sensation on site (hereinafter, referred to as a "sizzle image"). As the sizzle image, for example, a walking scene of a person or a walking road surface can be selected.

Additionally, the type and the number of categories can be appropriately set in response to the purpose of generating the highlight moving image and can be set to an example other than the above-described four types. Here, when the images are classified into a plurality of categories, deep learning using a Deep Neural Network (DNN) can be used. In this case, the images which are classified by the categories in advance by the user are used as the teaching data and learning of a category classifier is performed using the teaching data. Then, when an unclassified image (for example, pixel data and sensor information as components) is input to the classifier subjected to the learning, each image can be classified into one of the categories.

Additionally, it is possible to set the categories for the images by the determination of the user or to automatically set the categories by conditionally determining parameters acquired at the time of capturing the images or the image contents of the images in addition to the operation of classifying the images into the categories by the deep learning. When the categories are automatically set for the images, machine learning such as Support Vector Machine (SVM) or Bag-of-Feature (BoF) or a probabilistic model such as Bayes can be used. In this case, the conversion from each image into the feature amount is performed. For example, the image contents can be converted into the feature amount based on the number of persons or faces, a color bar graph, or a composition. Meanwhile, the sensor information can be converted into the feature amount using a Fast Fourier Transform (FFT) analysis result or an auto-correlation amount.

Figure 4:
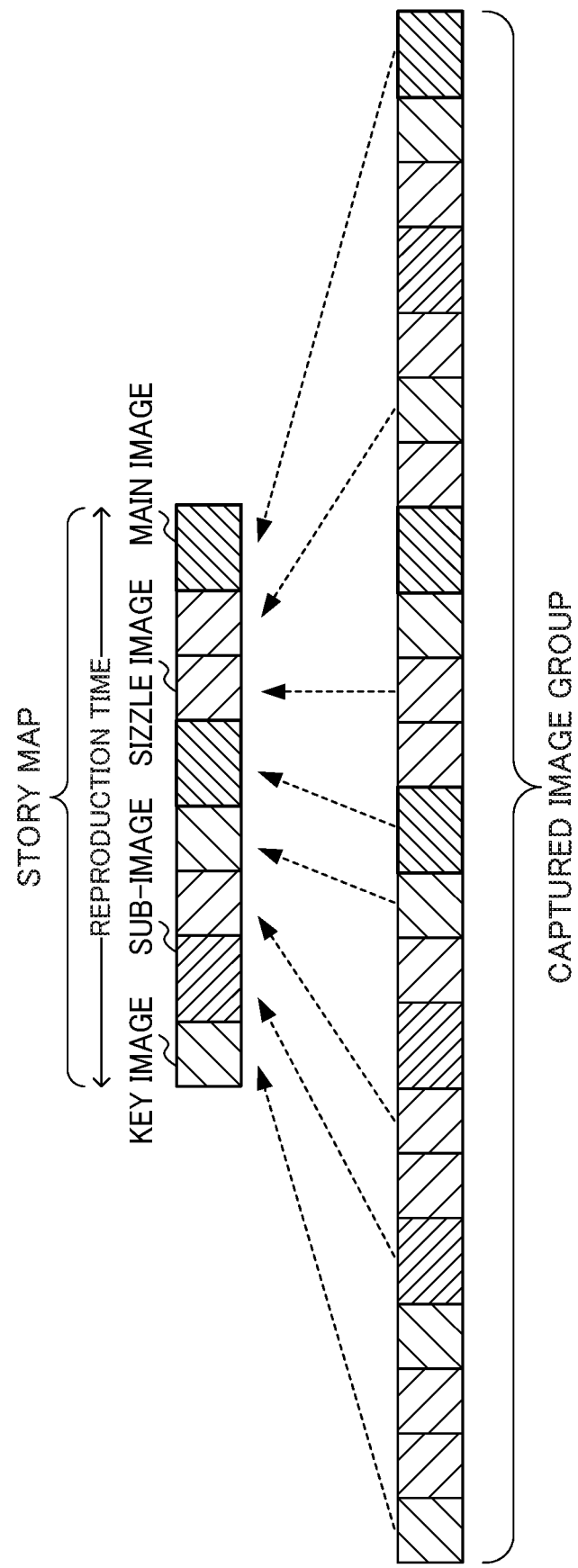
FIG. 4 is a schematic diagram illustrating an example of a story map.

Then, in the story map in which such categories are arranged in time series, the fitting to the story map is performed based on a category of each image in a captured image group, an image score, and an image capturing procedure (a position in time series). FIG. 4 is a schematic diagram illustrating an example of the story map. As illustrated in FIG. 4, the story map is data in which categories are arranged in time series while the total reproduction time is determined.

In this embodiment, the categories arranged in the story map are provided such that the image reproduction time is set in advance for each category. Then, as will be described later, in each category arranged in the story map, an image to be fitted to the position and the category on the time axis of the story map is selected among the images of the captured image group. At this time, when the individual reproduction time of the selected image is longer than the reproduction time set in the category, the individual reproduction time of the image is clipped to the reproduction time corresponding to the category of the story map (here, the excess is deleted).

Figures 5A, 5B, 5C:
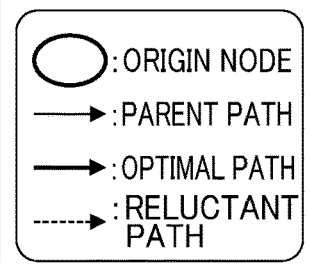
FIGS. 5A to 5C are schematic diagrams illustrating detailed image selection examples based on a story map. More specifically.

FIGS. 5A to 5C are schematic diagrams illustrating detailed image selection examples based on the story map. More specifically, FIG. 5A is a diagram illustrating the category (Category), the individual reproduction time (Time), and the image score (Score) of each image. FIG. 5B is a diagram illustrating a bonus multiplier set between the categories. FIG. 5C is a diagram illustrating the image score integration path for selecting the image. Additionally, in the examples illustrated in FIGS. 5A to 5C, for a simple description, a case in which three types of α, β, and γ are set as the categories of the images is illustrated. Further, the bonus multiplier is a parameter for correcting the score multiplied by the image score in response to a relationship between the categories arranged in the story map and the category of the selected image.

An image selection method illustrated in FIG. 5C is an image selection method in which an image to be fitted to the position and the category on the time axis of the story map is more easily selected as described above in the flow of optimization by score illustrated in FIGS. 2A and 2B and the individual reproduction time of the image is corrected to be clipped to the reproduction time corresponding to the category of the story map (here, the excess is deleted).

That is, in the image selection method illustrated in FIG. 5C, when the categories are the same at the interested position in time series and the images in the captured image group selectable at that position in the story map, the image score is increased by multiplying the bonus multiplier. Accordingly, it is easy to select an image matching the category arranged in the story map among the selectable images. Further, when the individual reproduction time of the selected image is longer than the time of switching the category arranged in the story map, it is possible to obtain an image based on the time series of the categories set in the story map by clipping the individual reproduction time to be fitted into the time set in the category.

For example, in FIG. 5C, the category of the image B is β and the category set to the time zone of 0 to 1 second in the story map is β. For that reason, when the image B is selected in the time zone of 0 to 1 second in the story map, the bonus multiplier 2 is multiplied by the score [5] of the image B so that the score is corrected to [10]. As a result, the score [10] of the corrected image B becomes higher than the score [8] of the image A (where the category is a) in the time zone of 0 to 1 second in the story map and the image B is selected as the image of the time zone of 0 to 1 second in the story map.

Further, since the individual reproduction time of the selected image B is 5 seconds and the reproduction time of the category in the time zone of 0 to 1 second in the story map is set to 2 seconds, the individual reproduction time of the image B is clipped to 2 seconds. Further, in FIG. 5C, the category of the image C is γ and the category set in the time zone of 2 to 3 seconds in the story map is α. For that reason, when the image C is selected in the time zone of 2 to 3 seconds in the story map, the bonus multiplier ½ is multiplied by the score [7] of the image C so that the score is corrected to [3.5]. Meanwhile, the category of the image D is a and the category set in the time zone of 2 to 3 seconds in the story map is α. For that reason, when the image D is selected in the time zone of 2 to 3 seconds in the story map, the bonus multiplier 2 is multiplied by the score [6] of the image D so that the score is corrected to [12]. As a result, the score [12] of the corrected image D becomes higher than the score [3.5] of the corrected image C in the time zone of 2 to 3 seconds in the story map and the image D is selected as the image of the time zone of 2 to 3 seconds subsequent to the image B.

Then, the image selected in the time zone after 3 seconds in the story map is selected based on the score multiplied by the bonus multiplier in the same way and the individual reproduction time is clipped if necessary. As a result, in this example, a path having an integrated score [25.5] among the paths becomes a path in which the integrated score is the largest. This path has a combination of the image D (the corrected score [12]) and the image E (the corrected score [3.5]) using the image B (the corrected score [10]) as an origin node. That is, a path of image B→image D→image E becomes an optimal path.

Thus, when this method is used, an image to be fitted to the position and the category on the time axis of the story map can be selected among the images classified by the categories with reference to the story map so that the integrated score becomes as large as possible under the limitation of, for example, the time or the number of sheets. For this reason, it is possible to generate appropriate moving images based on the story configuration intended by the story map.

Figure 6:
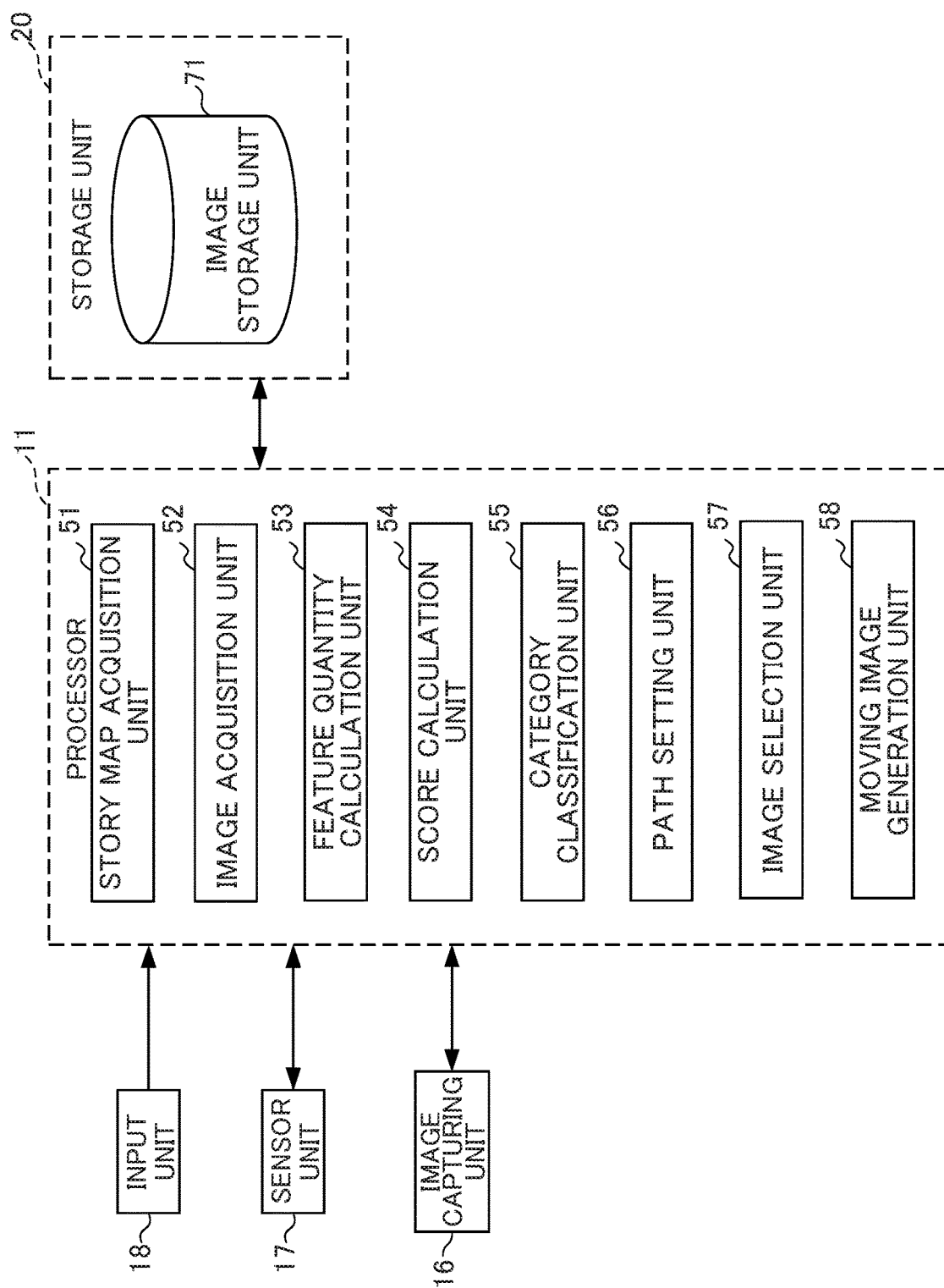
FIG. 6 is a functional block diagram illustrating functional configuration for executing a highlight moving image generation process in the functional configuration of the image capture apparatus of FIG. 1.

FIG. 6 is a functional block diagram illustrating a functional configuration for executing the highlight moving image generation process in the functional configuration of the image capture apparatus 1 of FIG. 1.

The highlight moving image generation process means a series of processes of generating the highlight moving image having a combination of the candidate images with a high image score, the image being fitted to the position and the category on the time axis of the story map among the plurality of candidate images.

At the time of executing the highlight moving image generation process, as illustrated in FIG. 6, in the processor 11, a story map acquisition unit 51, an image acquisition unit 52, a feature amount calculation unit 53, a score calculation unit 54, a category classification unit 55, a path setting unit 56, an image selection unit 57, and a moving image generation unit 58 are operated.

Further, an image storage unit 71 is set to one area of the storage unit 20. The image storage unit 71 stores image data correlated to the sensor information acquired at the time of capturing the image. The story map acquisition unit 51 acquires data of the story map referred to by the highlight moving image generation process. The data of the story map can be acquired as data generated by the user or data designed by the designer.

The image acquisition unit 52 acquires the candidate images corresponding to the highlight moving image from the image storage unit 71. In this embodiment, the sensor information acquired at the time of capturing the image is correlated with the data of the candidate image and the image acquisition unit 52 acquires the data of the sensor information at the time of acquiring the data of the candidate image. The feature amount calculation unit 53 calculates a feature amount for each acquired candidate image. In this embodiment, the feature amount calculation unit 53 calculates the feature amount of each candidate image based on the sensor information correlated to the image analysis result for the candidate image and the candidate image.

The score calculation unit 54 sets an image score as the value of the image based on the feature amount calculated by the feature amount calculation unit 53. Additionally, the image score may be uniquely set according to an item used for calculating the feature amount based on the subjectivity of the person or may be set comprehensively in response to the weighted values after weighting feature amount items based on machine learning using a subjective evaluation result as teaching data. The category classification unit 55 classifies the candidate images into a plurality of categories by deep learning using DNN. In this embodiment, the category classification unit 55 uses the images classified in advance by the categories by the user as the teaching data and performs learning of the classifier of the category using the teaching data. Then, the category classification unit 55 classifies the images into one of the categories by inputting an unclassified image (for example, pixel data and sensor information as components) to the classifier subjected to the learning.

The path setting unit 56 sets the combination (array) of the path which is possible in the matrix formed by the individual reproduction time of the highlight moving image and the candidate image based on the image capturing procedure of the image and the individual reproduction time of the set candidate image. In this embodiment, the path setting unit 56 sets the combination (array) of the path while correcting the score of the candidate image based on the category of the image and the category set in the story map.

Figure 7:
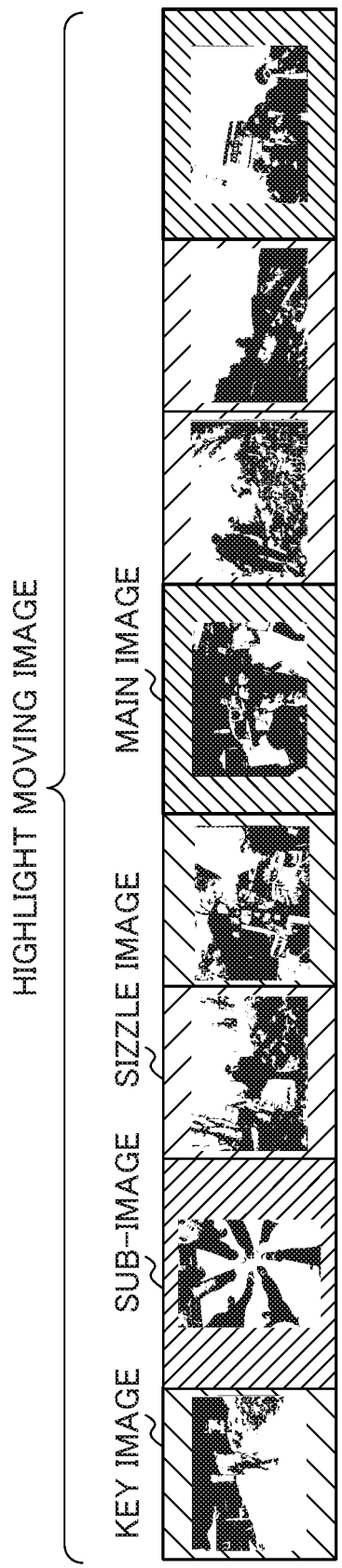
FIG. 7 is a schematic diagram illustrating an example of a generated highlight moving image.

The image selection unit 57 selects a path in which the integrated score increases and selects a candidate image constituting the path. In this embodiment, the image selection unit 57 selects the candidate image according to the image selection method in which an image to be fitted to the position and the category on the time axis of the story map is more easily selected in the flow of optimization by score illustrated in FIGS. 2A and 2B and the individual reproduction time of the image is corrected to be clipped to the reproduction time corresponding to the category of the story map (here, the excess is deleted). For example, when the categories are the same at the interested position in time series and the candidate images in the captured image group selectable at that position in the story map, the image selection unit 57 increases the score of the candidate image by multiplying the bonus multiplier. Accordingly, it is easy to select the candidate image matching the category arranged in the story map among the selectable candidate images. Further, when the individual reproduction time of the selected candidate image is longer than the time of switching the category arranged in the story map, the image selection unit 57 obtains an image based on the time series of the categories set in the story map by clipping the individual reproduction time to be fitted to the time set in the category. The moving image generation unit 58 generates the highlight moving image in which the candidate image of the path selected by the image selection unit 57 is fitted to the set large reproduction time. FIG. 7 is a schematic diagram illustrating an example of the generated highlight moving image. As illustrated in FIG. 7, when the image is selected from the candidate image according to the above-described method, the highlight moving image is generated from the featured image based on the time series of the categories set in the story map.

[Operation]

Next, an operation of the image capture apparatus 1 will be described. FIG. 8 is a flowchart illustrating a flow of a highlight moving image generation process executed by the image capture apparatus 1 of FIG. 1 having the functional configuration of FIG. 6. The highlight moving image generation process is started by an operation of starting the highlight moving image generation process using the input unit 18 by the user.

In step S1, the story map acquisition unit 51 acquires the data of the story map to be referred to by the highlight moving image generation process. In step S2, the image acquisition unit 52 acquires the candidate images corresponding to the highlight moving image from the image storage unit 71. Additionally, the sensor information acquired at the time of capturing the image is correlated to the data of the candidate image and the image acquisition unit 52 acquires the data of the sensor information at the time of acquiring the data of the candidate image. In step S3, the feature amount calculation unit 53 calculates the feature amount for each of the acquired candidate images. At this time, the feature amount calculation unit 53 calculates the feature amount of each of the candidate images based on the sensor information correlated to the image analysis result for the candidate image and the candidate image.

In step S4, the score calculation unit 54 sets the image score as the value of the image based on the feature amount calculated by the feature amount calculation unit 53. In step S5, the category classification unit 55 classifies the candidate image by a plurality of categories by the deep learning using DNN. At this time, the category classification unit 55 uses the image classified in advance by the categories by the user as the teaching data and performs learning of the classifier of the category using the teaching data. Then, the category classification unit 55 classifies the images into one of the categories by inputting an unclassified image (for example, pixel data and sensor information as components) to the classifier subjected to the learning.

In step S6, the path setting unit 56 sets the combination (array) of the path which is possible in the matrix formed by the individual reproduction time of the highlight moving image and the candidate image based on the image capturing procedure of the image and the individual reproduction time of the set candidate image. At this time, the path setting unit 56 sets the combination (array) of the path while correcting the score of the candidate image based on the category of the image and the category set in the story map.

In step S7, the image selection unit 57 selects a path in which the integrated score is the largest and selects a candidate image constituting the path. At this time, the image selection unit 57 selects the candidate image according to the image selection method in which an image to be fitted to the position and the category on the time axis of the story map is more easily selected in the flow of optimization by score illustrated in FIGS. 2A and 2B and the individual reproduction time of the image is corrected to be clipped to the reproduction time corresponding to the category of the story map (here, the excess is deleted). For example, when the categories are the same at the interested position in time series and the candidate images in the captured image group selectable at that position in the story map, the image selection unit 57 increases the candidate image score by multiplying the bonus multiplier. Further, when the individual reproduction time of the selected candidate image is longer than the time of switching the category arranged in the story map, the image selection unit 57 obtains an image based on the time series of the categories set in the story map by clipping the individual reproduction time to be fitted to the time set in the category.

In step S8, the moving image generation unit 58 generates the highlight moving image formed so that the candidate image of the path selected by the image selection unit 57 is fitted to the set large reproduction time. After step S8, the highlight moving image generation process ends. With such a process, a candidate image to be fitted to the position and the category on the time axis of the story map is selected among the candidate images in the captured image group for the categories arranged in the story map. At this time, when the individual reproduction time of the selected candidate image is longer than the reproduction time set in the category, the individual reproduction time of the candidate image is clipped to the reproduction time corresponding to the category of the story map.

Accordingly, an image to be fitted to the position and the category on the time axis of the story map can be selected among the images classified by the categories with reference to the story map so that the integrated score becomes as large as possible under the limitation of, for example, the time or the number of sheets. For this reason, it is possible to generate appropriate moving images based on the story configuration intended by the story map. Thus, according to the image capture apparatus 1, it is possible to provide aggregated images which are very attractive to the user.

Modified Example 1

In the above-described embodiment, at the time of selecting a candidate image to be fitted to the position and the category on the time axis of the story map, an optimal image can be selected by setting the path based on a dynamic programming method using Dynamic Time Warping (DTW). That is, the candidate image group and the story map can be understood as two functions in which the time length and the number of samples are different. Then, a distance between the samples (the categories arranged in the story map and the candidate images of the candidate image group) of the candidate image group and the story map is calculated by DTW and a path in which the distance between the candidate image group and the story map is the shortest in the matrix showing the distance is specified. At this time, the distance between the samples of the candidate image group and the story map can be defined as a distance between the categories. Regarding the distance between the categories, for example, in the categories α, β, and γ illustrated in FIG. 5A, a distance between the same categories is set to zero, a distance between the categories a and β can be set to "5", a distance between the categories a and γ can be set to "10", and a distance between the categories β and γ can be set to "10".

The combination of the candidate images constituting the path specified in this way becomes the candidate images fitted to the story map and when the candidate images are arranged in time series, the highlight moving image in which detailed candidate images are set in the categories arranged in the story map can be generated.

Modified Example 2

In the above-described embodiment, a case of generating the highlight moving image summarizing the candidate image group including the candidate images corresponding to the moving images has been exemplified, but the invention is not limited thereto. For example, the invention can be also applied to a case of generating an aggregated image (a collage image, a slide show, or a highlight moving image) obtained by collecting features from the candidate image group including the candidate images corresponding to the still images. As an example, when the highlight moving image is generated from the still images, the candidate image group including the still images is classified by the category and an array (a story map) of the time-series category in the highlight moving image is prepared. Then, an image to be fitted to the position and the category on the time axis of the story map is selected and combined among the images classified by the category with reference to the story map. At this time, the individual reproduction time of the candidate image corresponding to the still image is set to the reproduction time set for each image of each category in the story map. Additionally, in the selection of the image, any one of the selection method illustrated in FIGS. 5A to 5C or the selection method illustrated in the first modified example can be used. Accordingly, it is possible to generate the aggregated image obtained by collecting the features from the candidate image group including the candidate image corresponding to the still image. Thus, it is possible to provide aggregated images which are very attractive to the user.

Modified Example 3

In the above-described embodiment, when an image to be fitted to the position and the category on the time axis of the story map is selected from the candidate image group, the story map is extended to the length of the candidate image group and the candidate images in the same category in the time zone of each of the categories arranged in the extended story map are selected to generate the aggregated image. At this time, when a plurality of candidate images in the same category can be selected in the time zone of each of the categories arranged in the extended story map, it is possible to select the candidate image with a higher image score. With such a method, it is possible to generate the aggregated image obtained by collecting the features from the candidate image group by a simple process.

Modified Example 4

In the above-described embodiment, when an image to be fitted to the position and the category on the time axis of the story map is selected from the candidate image group, the candidate image may be selected by the bonus multiplier and the position on the time axis from the images of the category to be selected according to the story map without calculating an individual image score in advance. With such a method, it is possible to generate the aggregated image obtained by collecting the features from the candidate image group by a simple process.

Modified Example 5

In the above-described embodiment, the image score is calculated in consideration of the bonus multiplier in time series of the story map from the candidate image group, but the aggregated image may be generated by selecting images by the number necessary for the story map in order of the high image score in each category after classifying the candidate image group into each category. Further, the aggregated image may be generated with an array fitted to the story map by reading information on the timing of capturing each image at the time of generating the aggregated image from the candidate image selected by the above-described method. With such a method, it is possible to generate the aggregated image obtained by collecting the features from the candidate image group by a simple process.

Modified Example 6

In the above-described embodiment, the image score is calculated in consideration of the bonus multiplier according to the time series of the story map from the candidate image group, but the aggregated image may be generated by selecting images by the number necessary for the story map in random from each category after classifying the candidate image group by the categories. With such a method, it is possible to simplify the image selection process and to generate the aggregated image obtained by collecting the features from the candidate image group.

The image capture apparatus 1 with the above-described configuration includes the image acquisition unit 52, the image selection unit 57, and the moving image generation unit 58. The image acquisition unit 52 acquires a plurality of images. The image selection unit 57 selects an image based on the evaluation result obtained by evaluating the images from the image groups corresponding to the classification based on the image contents in the images. The moving image generation unit 58 combines the selected images into one image. Accordingly, it is possible to select images based on the evaluation result of the image in consideration of the classification of the image in the images and to combine the images into one image. Thus, it is possible to provide aggregated images which are very attractive to the user. Additionally, when one aggregated image is generated, the aggregated image may be generated by the same selection reference for generating the aggregated image or may be generated by a plurality of selection references for generating the aggregated image.

At the time of selecting an image at the interested position in the story map, when the classification of that position matches the classification of the image, the image selection unit 57 performs a correction in which the evaluation of the image increases. Accordingly, it is easy to select an image matching the classification at the interested position in the story map.

The images include the moving image. The story map shows an array of temporal positions and lengths in the classification of the image. At the time of selecting an image at the interested position in the story map, when the image reproduction time is longer than the temporal length at that position, the image selection unit 57 clips the image reproduction time. Accordingly, it is possible to set the reproduction time of the selected image to the reproduction time set in the story map and to obtain an image based on the time series of the classification set in the story map.

The image capture apparatus 1 includes a category classification unit 55. The category classification unit 55 classifies the images acquired by the image acquisition unit 52 into a plurality of image groups based on the image contents. Accordingly, it is possible to classify the images and to select an image in consideration of the classification of the image.

The image capture apparatus 1 includes the score calculation unit 54. The score calculation unit 54 evaluates the images acquired by the image acquisition unit 52. Accordingly, it is possible to select an image by reflecting the evaluation of the image.

Additionally, the invention is not limited to the above-described embodiment and modifications and improvements in the range of attaining the object of the invention are included in the invention. For example, in the above-described embodiment, it has been described that the story map is the array of the time-series categories in the highlight moving image (the aggregated image). That is, it has been described that the position and the category on the time axis of the selected candidate image are defined in the story map. In contrast, the position and the category in space of the selected candidate image may be defined in the story map. In this case, the arrangement position of the candidate image in the planar image (the still image) and the category of the candidate image disposed at each position are defined in the story map.

In the above-described embodiment, the highlight moving image (the aggregated image) is generated by selecting an image from the candidate image corresponding to the moving image or the still image, but for example, in one or a plurality of moving images, a frame image constituting the moving image may be used as the candidate image. Further, the aggregated image may be generated by setting a plurality of kinds of still images, moving image, or frame images to the candidate image and selecting an image from the different candidate images.

Although in the embodiment described above, a digital camera is adopted as an example for explaining the image capture apparatus 1 to which the present invention is applied, but the embodiment is not limited thereto. For example, the present invention can be applied to electronic devices in general that include a representative image extraction function. For example, the present invention can be applied to a notebook type personal computer, a printer, a television receiver, a camcorder, a portable type navigation device, a cellular phone, a smartphone, a portable game device, and the like.

The processing sequence described above can be executed by hardware, and can also be executed by software. In other words, the hardware configuration of FIG. 6 is merely illustrative examples, and the present invention is not particularly limited thereto. More specifically, the types of functional blocks employed to realize the above-described functions are not particularly limited to the examples shown in FIG. 6, so long as the image capture apparatus 1 can be provided with the functions enabling the aforementioned processing sequence to be executed in its entirety. A single functional block may be constituted by a single piece of hardware, a single installation of software, or a combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or recording medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium 31 of FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 1 in which the program is recorded, and a hard disk included in the storage unit 20 of FIG. 1, and the like.

It should be noted that, in the present specification, the steps defining the program recorded in the storage medium include not only the processing executed in a time series following this order, but also processing executed in parallel or individually, which is not necessarily executed in a time series.

The embodiments of the present invention described above are only illustrative, and are not to limit the technical scope of the present invention. The present invention can assume various other embodiments. Additionally, it is possible to make various mod cations thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An image processing apparatus comprising:
a processor; and
a memory,
wherein the processor executes a program stored in the memory to perform operations comprising:
evaluating each of a plurality of images, based on a feature amount of each of the plurality of images;
classifying the plurality of images into any one of a plurality of categories, based on content of each of the plurality of images;
selecting an image from the classified plurality of images so as to be fitted to a story map showing an array of temporal positions, wherein any one category of the plurality of categories is assigned to each of the temporal positions of the story map, wherein the image is selected to be fitted to the story map based on a result of evaluating each of the plurality of images and based on said any one of the plurality of categories into which the image is classified, and wherein the selection is performed for each temporal position of the story map whereby a plurality of the images are selected; and
generating one image from the plurality of selected images.

2. The image processing apparatus according to claim 1, wherein, when the processor selects the image at an interested position among the temporal positions in the story map, the processor is further configured to correct the evaluation of the image to be higher when a category assigned to the interested position matches the category of the image at that temporal position.

3. The image processing apparatus according to claim 1, wherein the plurality of images include a moving image, wherein the story map further shows temporal lengths of the temporal positions,
wherein, when the processor selects the image at an interested position among the temporal positions in the story map, the processor is further configured to clip a reproduction time of the image at an interested position when the reproduction time of the image at the interested position is longer than the temporal length of the interested position.

4. The image processing apparatus according to claim 1, wherein the processor is further configured to calculate a distance between the categories of the plurality of images and the categories assigned to the temporal positions of the story map and selects an image from the plurality of images to be fitted to the story map based on a result of the calculation.

5. The image processing apparatus according to claim 1, wherein the processor is further configured to determine a total reproduction time in the story map and arranges categories of images in time series.

6. The image processing apparatus according to claim 1, wherein the processor is further configured to change a temporal length of the story map so that the story map has a temporal length of the category and selects an image from the plurality of categories based on the array of the temporal positions arranged in the changed story map.

7. The image processing apparatus according to claim 1, wherein the processor is further configured to select an image from at least one of the plurality of categories to be fitted to the story map without calculating an individual image score in advance.

8. The image processing apparatus according to claim 1, wherein the processor is further configured to select a number of images required for the story map in descending order of a high image score from at least one of the plurality of categories.

9. The image processing apparatus according to claim 1, wherein the processor is further configured to select a number of images required for the story map in random from at least one of the plurality of categories.

10. The image processing apparatus according to claim 1, wherein the processor is further configured to select an image to be fitted to the story map from at least one of the plurality of categories based on a same selection criterion.

11. The image processing apparatus according to claim 1, wherein the processor is further configured to select at least one image from at least one of the plurality of categories to be fitted to the story map based on different selection criteria.

12. An image processing method executed by a processor of an image processing apparatus, the image processing method comprising:
evaluating each of a plurality of images, based on a feature amount of each of the plurality of images;
classifying the plurality of images into any one of a plurality of categories, based on content of each of the plurality of images;
selecting an image from the classified plurality of images so as to be fitted to a story map showing an array of temporal positions, wherein any one category of the plurality of categories is assigned to each of the temporal positions of the story map, wherein the image is selected to be fitted to the story map based on a result of evaluating each of the plurality of images and based on said any one of the plurality of categories into which the image is classified, and wherein the selection is performed for each temporal position of the story map whereby a plurality of the images are selected; and generating one image from the plurality of selected images.

13. A non-transitory computer-readable storage medium storing a program that is executable by a computer that comprises a processor, the program being executable by the computer to cause the computer to perform operations comprising:

evaluating each of a plurality of images, based on a feature amount of each of the plurality of images;

classifying the plurality of images into any one of a plurality of categories, based on content of each of the plurality of images;

selecting an image from the classified plurality of images so as to be fitted to a story map showing an array of temporal positions, wherein any one category of the plurality of categories is assigned to each of the temporal positions of the story map, wherein the image is selected to be fitted to the story map based on a result of evaluating each of the plurality of images and based on said any one of the plurality of categories into which the image is classified, and wherein the selection is performed for each temporal position of the story map whereby a plurality of the images are selected; and generating one image from the plurality of selected images.

14. The image processing apparatus according to claim 2, wherein the processor is further configured to classify the plurality of images into any one of categories of a main image, a sub image, a key image and a sizzle image, based on content of each of the plurality of images.

* * * * *